Oct. 10, 1950 — L. ABBOTT — 2,525,109
FISH TRAP
Filed Feb. 6, 1948 — 3 Sheets-Sheet 1
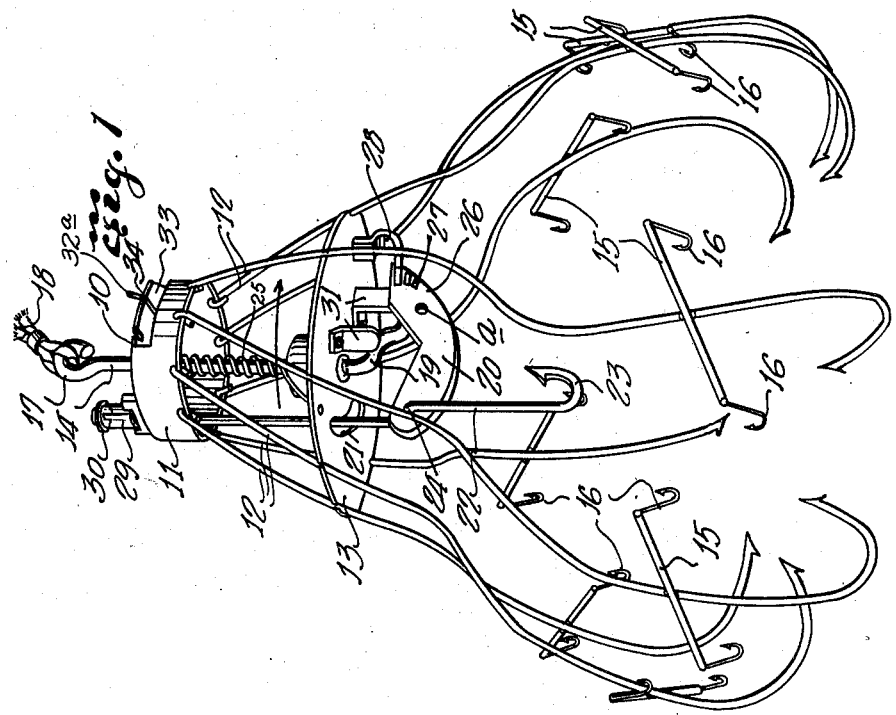
Lea Abbott
INVENTOR.
ATTORNEY

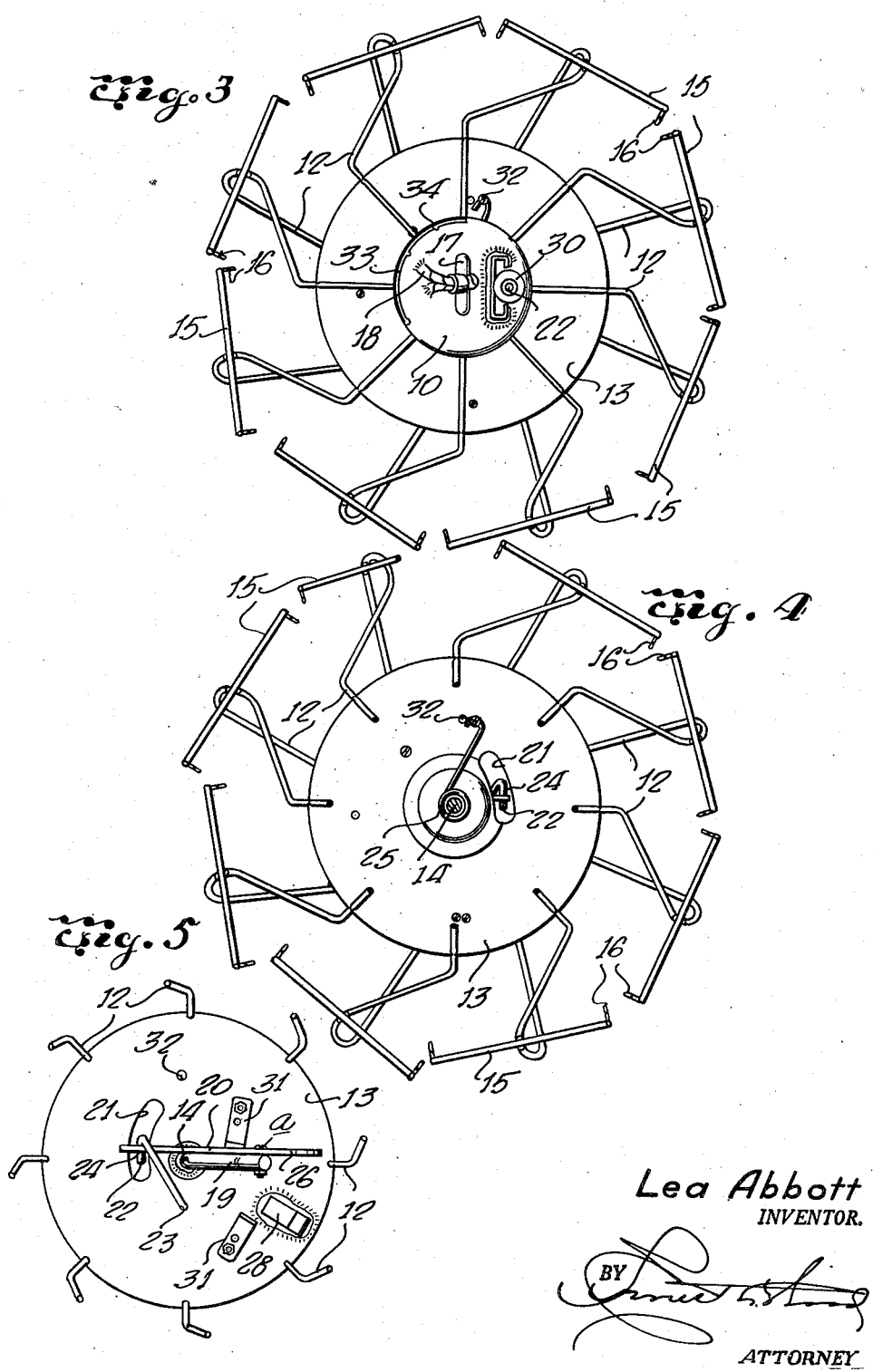

Oct. 10, 1950     L. ABBOTT     2,525,109
FISH TRAP
Filed Feb. 6, 1948     3 Sheets-Sheet 3
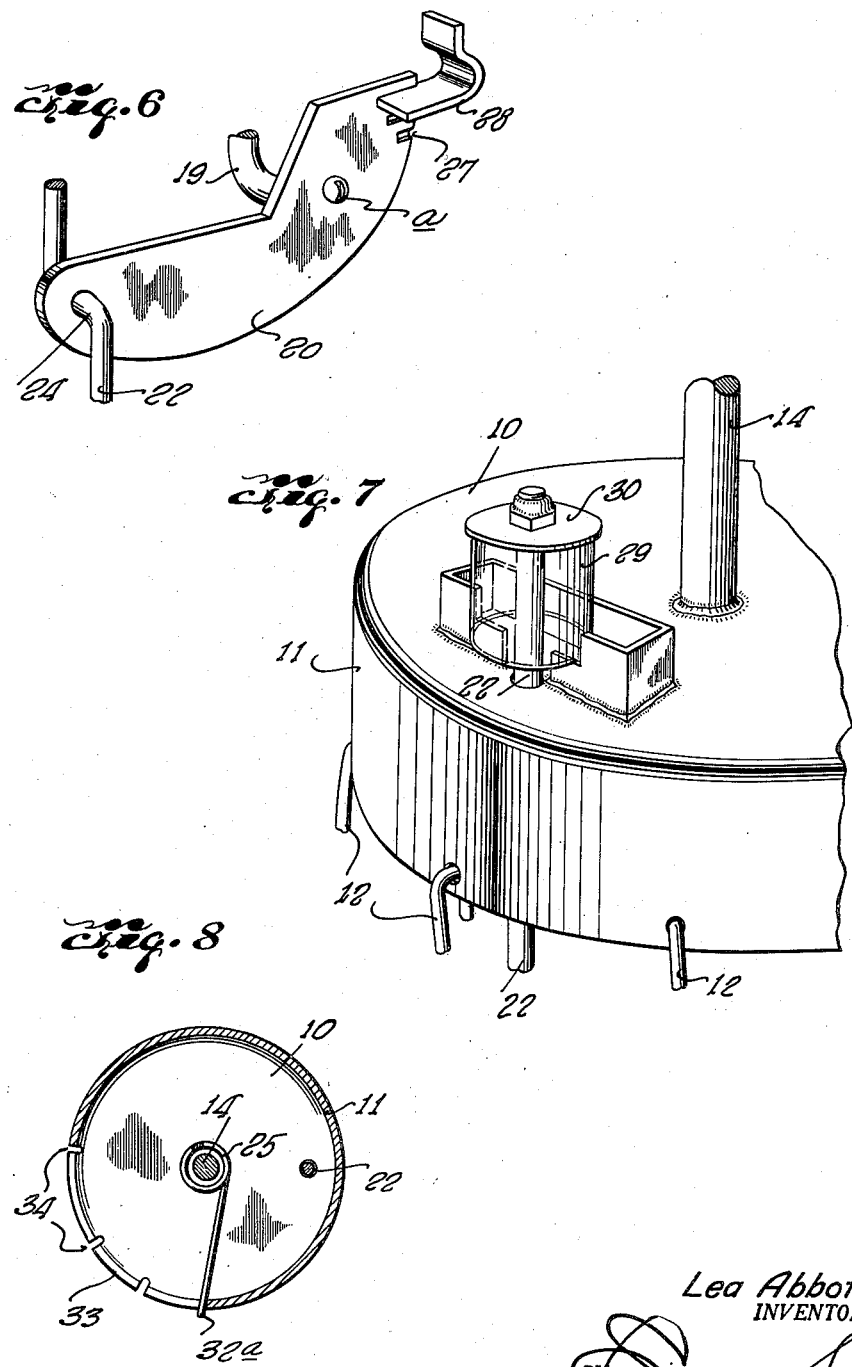
Lea Abbott
INVENTOR.
ATTORNEY Patented Oct. 10, 1950

2,525,109

UNITED STATES PATENT OFFICE 2,525,109

FISH TRAP

Lea Abbott, Dallas, Tex.

Application February 6, 1948, Serial No. 6,590

6 Claims. (Cl. 43—89)

This invention relates to combined fish hooks and snares and it has particular reference to a collapsible fish trap and hook.

The principal object of the invention is to provide a device so designed and constructed to insure against escape of prospective catches through the provision of a plurality of curved wires forming a cage-like trap and spirally displaceable under spring tension for expansion to set the trap and further, the provision of a centrally disposed bait hook having the function to release the wires to the influence of the spring to collapse the wires about a fish when the latter nibbles the bait suspended on the hook.

Another object of the invention is to provide a fish snare in which the series of wires defining the trap are each provided with a hook carrying cross-member, these cross-members being affixed to the wires in oblique relationship therewith so that their ends will lie in overlapping relationship when the trap is collapsed and will thereby intercross the interstices between the wires to preclude escape of smaller fish therethrough.

Another object of the invention is to provide a fish trap in which the spring effective to collapse the wires constituting the trap is provided with means for adjusting its tension to accelerate or decelerate the closing action of the wires.

Still another object of the invention is to provide setting mechanism for the bait hook which includes means for increasing or decreasing the sensitivity thereby which determines the degree of downward force necessary to exert on the hook to release the trap wires to the action of the spring and is useful in setting the trap to catch either large or small fish.

Yet another object of the invention is to provide means for retaining a water soluble medium adapted to prevent premature collapsing of the trap while it is being placed in the water.

With the foregoing objects in view, the invention has further reference to certain features of accomplishment which will become apparent as the description proceeds, taken in connection with the accompanying drawings wherein:

Figure 1 is a perspective view of a fish trap constructed according to the invention, shown in open position.

Figure 2 is a similar view but showing the trap collapsed.

Figure 3 is a top plan view.

Figure 4 is a view in transverse section, taken on line 4—4 on Figure 2.

Figure 5 is a view in transverse section, taken on line 5—5 on Figure 2.

Figure 6 is a detail perspective view of the trap releasing trigger.

Figure 7 is a fragmentary top perspective view showing the trap in set position, and Figure 8 is a transverse sectional view through the mounting member, as viewed from its underside.

Continuing with a more detailed description of the drawing, reference numeral 10 denotes a flanged mounting of circular form from whose flange 11 is suspended in annularly spaced relationship a plurality of wires 12. The shanks or upper portions of these wires are substantially straight but towards their midsections they are curved laterally, thence inwardly at their lower ends and, while not shown, the lower extremities of the wires may be formed with hooks, if desired. The upper extremities of the wires 12 are so joined to the mounting 10 as to enable the wires to swing laterally and spaced below the mounting 10 is a disc or circular plate 13 having circumferentially spaced recesses in its perimeter which are adapted to receive and retain the wires 12. The wires 12 are, however, loosely held in the recesses of the plate 13, at least permitting limited longitudinal displacement thereof for the purpose to be presently explained.

When either the mounting 10 or the plate 13 is held stationary and the other rotated, the obvious effect on the wires 12 is that they will be moved simultaneously into oblique or spiral relationship with the longitudinal axis of a rod 14, on which the mounting 10 and plate 13 are supported in spaced apart relationship. Each of the wires 12 has a cross-member 15 affixed thereto in angular relationship with its axis so that its ends will overlap the ends of adjacent and similar cross-members on adjacent wires when the latter are in collapsed position. Each cross-member 15 has on each end thereof a hook 16, directed downwardly and inwardly of the cage or trap defined by the wires and these hooks serve as snares should smaller fish seek escape between the wires.

The stem or rod 14 has an eye 17 formed at its upper end to receive a line 18 by which the trap is suspended in the water. The lower end 19 of the rod is turned at substantially right angles to its axis under the plate 13 and pivotally attached to the rod end 19 at *a* is a trigger 20. Disposed in parallelism with the rod 14 and extending slidably through an aperture in the mounting 10 and an arcuate slot 21 in the plate 13 is a shank 22, whose lower end is formed into a fish hook 23 adapted to receive bait. A short right angle bend 24 is made in the shank 22 above the hook 23. The shank 22 is passed through an aperture in the end of the trigger 20 opposite the pivot point *a* and the shank 22 is passed through this aperture. The trigger 20 is fulcrumed on the bend 24 of the shank as shown in Figures 1 and 2.

To set the trap, the mounting 10 is held stationary while the plate 13 is rotated against the resistance of a torque spring 25 which surrounds the rod 14 between the mounting and plate. The tail 26 of the trigger 20 has a series of parallel notches 27 therein of different depths, as apparent in Figures 1 and 2. These notches are adapted to selectively receive the edge of a bracket 28 affixed to and depending from the underside of the plate 13 to retain the trigger 20 in set position. Selection of the notches 27 is made according to the size of fish expected to be caught. For example, the trigger is set in a shallow notch if small fish are sought while increasingly deeper notches are used for larger fishes in which case the setting is less sensitive.

When the trigger is set as described, the upper end of the shank 22 will extend above the mounting 10 as shown in Figure 1. A plug 29 of any well known water soluble composition is placed under a head 30, formed on the upper end of the shank 22. This plug is adapted to hold the shank 22 in raised position until the trap is dropped into the water to prevent accidental release of the trigger 20 in the process of submerging the trap. After submergence however, the water soluble plug 29 will dissolve leaving the trigger set, preparatory to release from the retaining bracket 28 by a fish biting the bait suspended on the hook 23.

When a pull is exerted on the hook 23, as by a fish, the trigger 20 is tilted on its pivot *a*, the tail portion 27 thereof moving upwardly above the retaining portion of bracket 28. The spring 25 immediately acts to return the plate 13 to its original position and with it, the wires 12 to enclose the fish which may or may not have been ensnared on the hook 23, thus increasing against escape of the fish. On each side of the trigger 20 is a stop 31 which limits displacement of the trigger in either direction.

The lower end of the torque spring 25 is affixed at 32 to the plate 13 while the upper end 32*a* thereof is turned at right angles to the body thereof and is passed through a semi-circular slot 33 in the mounting 10, the latter having a series of spaced notches 34 therein. Tension on the spring is increased or decreased by selectively setting the end thereof in the notches 34 with the result that closing impetus of the trap may be regulated.

Manifestly, the construction as shown and described is capable of some modification and such modification as may be construed to fall within the scope and meaning of the appended claims is also considered to be within the spirit and intent of the invention.

What is claimed is:

1. A fish trap including a circular group of curved wires defining a cage, a mounting to which the upper ends of said wires are pivoted, a circular plate having peripheral recesses receiving said wires and adapted to be rotated to spirally displace said wires to expand said cage, a bait receiving hook having a shank, said plate and mounting each having an aperture slidably receiving said shank, a trigger pivoted to said hook shank at one end and whose opposite end is provided with spaced notches of different depths, a suspension rod extending through said mounting and plate and to the lower end of which said trigger is pivoted, a spring surrounding said suspension rod adjustably connected at its upper end to said mounting and at its lower end to said circular plate and adapted to resist rotative displacement of said plate relative to said mounting, means receivable in one of the notches of said trigger for holding the latter in set position against the resistance of said spring and adapted to release the same to the action of said spring to collapse said wires upon downward pull on said hook, and water soluble means for holding said hook shank in raised position preparatory to submergence of said trap in water.

2. A fish trap including a plurality of curved wires adapted to define a cage, a mounting to which the upper ends of said wires are pivotally suspended, a circular plate below said mounting and having spaced peripheral recesses loosely retaining said wires and adapted to be rotated to angularly displace said wires with respect to their points of suspension to expand said cage, spring means resisting expanding movement of said wires, a bait hook having a shank extending through and slidably displaceable in said mounting and plate, a trigger for retaining said wires in expanded position and releasable upon downward movement of said hook and shank to collapse said wires under action of said spring means, and means for adjustably holding said trigger in set position.

3. A fish trap including a cage formed with a plurality of circularly spaced and curved wires, a mounting from which said wires are pivotally suspended, a plate supported below said mounting to which said wires are loosely connected intermediate their ends and adapted to be rotated with respect to said mounting to spirally displace and expand said wires, a spring resisting displacement of said wires, a bait hook, a longitudinally movable shank supporting said bait hook whose upper end extends through an aperture in said mounting, a trigger having connection with said bait hook for holding said wires in displaced position and releasable by a pull exerted on said hook to close said wires under action of said spring, and means for holding said trigger in set position.

4. A fish trap as set forth in claim 3, further defined in that a plug of water soluble material is disposed on the mounting to support the shank and hold the bait hook in raised position preparatory to submergence of said trap in water.

5. A fish trap including a shaft, a cage defined by a plurality of circularly spaced and curved wires, a mounting on said shaft from which said wires are suspended pivotally and displaceable spirally to expand the same, a circular, peripherally notched plate also mounted on said shaft below said mounting whose notches are adapted to retain said wires intermediate their ends, spring means on said shaft for resisting displacement of said plate and wires, a bait hook and shank, a trigger having connection with said shank for holding said wires in displaced position under tension of said spring means and adapted to be tripped upon downward pull on said hook to release said wires to the collapsing action of said spring means, and means for holding said trigger adjustably in set position.

6. The structure set forth in claim 5, further defined in that the trigger is provided with a plurality of notches of different depths, and a retaining means on the circular plate selectively receiving the notches of said trigger to vary the degree of the latter's resistance to releasing action.

LEA ABBOTT.

REFERENCES CITED

The following references are of record in the file of this patent:

UNITED STATES PATENTS

| Number | Name | Date |
| --- | --- | --- |
| 422,331 | Bradford | Feb. 25, 1890 |
| 1,734,612 | Coleman | Nov. 5, 1929 |

FOREIGN PATENTS

| Number | Country | Date |
| --- | --- | --- |
| 112,958 | Great Britain | Feb. 7, 1918 |